United States Patent
Miyahara et al.

(10) Patent No.: US 9,850,833 B2
(45) Date of Patent: Dec. 26, 2017

(54) DIAGNOSIS DEVICE FOR INTERNAL COMBUSTION ENGINE, AND DIAGNOSIS METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Hideki Miyahara, Miyoshi (JP); Kenichiro Kawase, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 15/036,594

(22) PCT Filed: Nov. 14, 2014

(86) PCT No.: PCT/IB2014/002585
§ 371 (c)(1),
(2) Date: May 13, 2016

(87) PCT Pub. No.: WO2015/071755
PCT Pub. Date: May 21, 2015

(65) Prior Publication Data
US 2016/0290255 A1    Oct. 6, 2016

(30) Foreign Application Priority Data

Nov. 18, 2013   (JP) ................. 2013-238098

(51) Int. Cl.
*B60T 7/12* (2006.01)
*F02D 41/00* (2006.01)
(Continued)

(52) U.S. Cl.
CPC ....... *F02D 41/005* (2013.01); *F02D 41/0005* (2013.01); *F02D 41/18* (2013.01);
(Continued)

(58) Field of Classification Search
CPC ....... F02D 2021/086; F02D 2041/0075; F02D 41/005; F02D 41/0062; F02D 19/025;
(Continued)

(56) References Cited

U.S. PATENT DOCUMENTS

4,793,318 A * 12/1988 Tsurusaki ............... F02M 26/55
                                                        123/676
2001/0035172 A1 * 11/2001 Osaki ...................... F02D 21/08
                                                        123/568.16
(Continued)

FOREIGN PATENT DOCUMENTS

EP   1 347 166 A1   9/2003
EP   1 541 841 A1   6/2005
(Continued)

*Primary Examiner* — John Kwon
(74) *Attorney, Agent, or Firm* — Finnegan, Henderson, Farabow, Garrett & Dunner, LLP

(57) ABSTRACT

A diagnosis device for an engine, the diagnosis device includes an electronic control unit. The electronic control unit is configured to execute EGR diagnosis processing to diagnose whether or not the EGR device operates normally while a vehicle is being decelerated, execute air flow meter diagnosis processing to diagnose whether or not the air flow meter is normal while the vehicle is decelerated, execute the EGR diagnosis processing after starting the air flow meter diagnosis processing, and execute the EGR diagnosis processing when the air flow meter diagnosis processing has not been completed and predetermined conditions that a duration of deceleration of the vehicle being shorter than a diagnosis time that is required to execute the air flow meter diagnosis processing are fulfilled.

6 Claims, 6 Drawing Sheets

(51) Int. Cl.
*F02D 41/18* (2006.01)
*F02D 41/22* (2006.01)
*F02M 26/49* (2016.01)
*F02D 41/24* (2006.01)
*F02D 41/02* (2006.01)
*F02D 41/12* (2006.01)

(52) U.S. Cl.
CPC ........... *F02D 41/222* (2013.01); *F02D 41/24* (2013.01); *F02M 26/49* (2016.02); *F02D 41/0072* (2013.01); *F02D 41/0225* (2013.01); *F02D 41/12* (2013.01); *F02D 2200/0402* (2013.01); *F02D 2200/0406* (2013.01); *Y02T 10/42* (2013.01)

(58) Field of Classification Search
CPC ........ F02D 19/0623; F02D 2200/0406; B60W 2510/0638
USPC ....... 701/108, 110, 114; 123/568.11, 568.14, 123/568.16, 568.21, 568.22; 73/117.3
See application file for complete search history.

(56) References Cited

U.S. PATENT DOCUMENTS

| | | | |
|---|---|---|---|
| 2007/0062499 A1* | 3/2007 | Miyasako | F02B 77/082 123/568.16 |
| 2011/0011378 A1* | 1/2011 | Nakamura | F02M 26/49 123/568.16 |
| 2014/0074379 A1* | 3/2014 | Aoyagi | F02D 41/2454 701/104 |
| 2016/0327009 A1* | 11/2016 | Tanaka | F02M 26/49 |

FOREIGN PATENT DOCUMENTS

| | | |
|---|---|---|
| JP | 9-280117 | 10/1997 |
| JP | 2005-61335 | 3/2005 |
| JP | 2007-85225 | 4/2007 |
| WO | WO 2009/130563 A1 | 10/2009 |

* cited by examiner

FIG. 2

| GEAR POSITION | VEHICLE SPEED V | | | |
|---|---|---|---|---|
| | 0 ≤ V < FIRST VEHICLE SPEED V1 | FIRST VEHICLE SPEED V1 ≤ V < SECOND VEHICLE SPEED V2 | SECOND VEHICLE SPEED V2 ≤ V < THIRD VEHICLE SPEED V3 | THIRD VEHICLE SPEED V3 ≤ V |
| FIRST GEAR | EGR DIAGNOSIS | EGR DIAGNOSIS | EGR DIAGNOSIS | AFM DIAGNOSIS |
| SECOND GEAR | EGR DIAGNOSIS | EGR DIAGNOSIS | EGR DIAGNOSIS | AFM DIAGNOSIS |
| THIRD GEAR | EGR DIAGNOSIS | EGR DIAGNOSIS | AFM DIAGNOSIS | AFM DIAGNOSIS |
| FOURTH GEAR | EGR DIAGNOSIS | AFM DIAGNOSIS | AFM DIAGNOSIS | AFM DIAGNOSIS |
| FIFTH GEAR | EGR DIAGNOSIS | AFM DIAGNOSIS | AFM DIAGNOSIS | AFM DIAGNOSIS |

DIAGNOSIS DEVICE FOR INTERNAL COMBUSTION ENGINE, AND DIAGNOSIS METHOD FOR INTERNAL COMBUSTION ENGINE

CROSS-REFERENCE TO RELATED APPLICATIONS

This application is a national phase application of International Application No. PCT/IB2014/002585, filed Nov. 14, 2014, and claims the priority of Japanese Application No. 2013-238098, filed Nov. 18, 2013, the content of both of which is incorporated herein by reference.

BACKGROUND OF THE INVENTION

1. Field of the Invention

The present invention relates to a diagnosis device for an internal combustion engine and a diagnosis method thereof.

2. Description of Related Art

As disclosed in Japanese Patent Application Publication No. 2005-61335 (JP 2005-61335 A), air flow meter diagnosis processing may be executed when the vehicle is being decelerated with fuel cut off. In the air flow meter diagnosis processing, when the intake air amount that is detected by an air flow meter is out of a predetermined normal range, the duration of the state is measured. When the duration is longer than a threshold value, the air flow meter is diagnosed as not normal.

In Japanese Patent Application Publication No. 2007-85225 (JP 2007-85225 A), one example of EGR diagnosis processing is described. In Japanese Patent Application Publication No. 2007-85225 (JP 2007-85225 A), an EGR valve that is provided in a return passage through which a portion of exhaust gas is returned into an intake pipe as EGR gas. In the EGR diagnosis processing, the EGR valve is forcibly opened and closed when the vehicle is being decelerated and the fluctuation of intake pressure in the intake pipe at this time is detected. Based on the result of comparison between the extent of the detected fluctuation of intake pressure and a predetermined failure determination value, the EGR device is diagnosed as being able to operate normally or not.

The intake pressure in the intake pipe can be calculated based on the intake air amount that is detected by an air flow meter. Thus, when both air flow meter diagnosis processing and EGR diagnosis processing are executed, it is desirable that the air flow meter diagnosis processing is executed first and the EGR diagnosis processing is executed after the air flow meter has been confirmed to be normal to ensure reliability of the EGR diagnosis processing.

SUMMARY OF THE INVENTION

When the diagnosis time that is required to execute the air flow meter diagnosis processing is relatively long, the air flow meter diagnosis processing may not be able to be completed because the deceleration of the vehicle may be ended before the air flow meter diagnosis processing is completed. In other words, when vehicle deceleration that continues for a short period of time is repeated, the air flow meter diagnosis processing is repeated because the air flow meter diagnosis processing cannot be completed even if it is started, resulting in a decrease of opportunities for EGR diagnosis processing to be executed.

The present invention provides a diagnosis device for an internal combustion engine that can prevent a decrease in reliability of the EGR diagnosis processing and ensure opportunities for the EGR diagnosis processing to be executed.

A first aspect of the present invention provides a diagnosis device for an internal combustion engine that is mounted on a vehicle, the internal combustion engine includes an EGR device and an air flow meter, the diagnosis device includes an electronic control unit. The electronic control unit is configured to (i) execute EGR diagnosis processing to diagnose whether or not the EGR device operates normally while the vehicle is being decelerated, (ii) execute air flow meter diagnosis processing to diagnose whether or not the air flow meter being normal while the vehicle is being decelerated, (iii) diagnose the EGR device as normal in the EGR diagnosis processing when a differential pressure between a first intake pressure and a second intake pressure is equal to or higher than an abnormality determination value, the first intake pressure is an intake pressure in an intake pipe of the internal combustion engine that is determined when an EGR valve of the EGR device is closed, and the second intake pressure is an intake pressure in the intake pipe that is determined when the EGR valve is open, (iv) execute the EGR diagnosis processing after starting the air flow meter diagnosis processing, and (v) execute the EGR diagnosis processing when the air flow meter diagnosis processing has not been completed and predetermined conditions that a duration of deceleration of the vehicle being shorter than a diagnosis time that is required to execute the air flow meter diagnosis processing are fulfilled.

The above configuration enables the air flow meter diagnosis processing to be started first and the EGR diagnosis processing to be subsequently executed. On the other hand, when predetermined conditions that suggest that the duration of deceleration of the vehicle will be shorter than the diagnosis time that is required to execute the air flow meter diagnosis processing are fulfilled, the EGR diagnosis processing is executed even if the air flow meter diagnosis processing has not been completed. Thus, a situation can be prevented in which the EGR diagnosis processing cannot be executed for a long period of time because the air flow meter diagnosis processing is repeatedly executed despite the fact that it cannot be completed.

In other words, according to the above configuration, the EGR diagnosis processing is, basically, executed on condition that the air flow meter diagnosis processing has been started or the air flow meter diagnosis processing has been completed. On the other hand, according to the above configuration, when it is predicted that the air flow meter diagnosis processing cannot be completed, the EGR diagnosis processing is executed. It is, therefore, possible to prevent a decrease in reliability of the EGR diagnosis processing and to ensure opportunities for the EGR diagnosis processing to be executed.

In the above diagnosis device, the electronic control unit may be configured to execute the EGR diagnosis processing after the air flow meter diagnosis processing has been completed when the predetermined conditions are not fulfilled. According to the above configuration, the EGR diagnosis processing can be, basically, executed with the air flow meter diagnosis processing having been completed.

The time that is required to bring the vehicle to a halt tends to be longer as the vehicle speed is higher when the vehicle starts to be decelerated. Based on this fact, it can be predicted that the duration of deceleration of the vehicle is long. In the above diagnosis device, the predetermined conditions may include a condition that the vehicle speed that is determined when the vehicle starts to be decelerated is lower than a determination value. In this case, when the vehicle speed that is determined when the vehicle starts to be decelerated is lower than a determination value, the predetermined conditions are fulfilled and the duration of deceleration of the vehicle can be therefore predicted to be shorter than the diagnosis time that is required to execute the air flow meter diagnosis processing. Thus, EGR diagnosis processing is executed even if the air flow meter diagnosis processing has not been completed. On the other hand, when the vehicle speed that is determined when the vehicle starts to be decelerated is equal to or higher than the determination value, the predetermined conditions are not fulfilled and the duration of deceleration of the vehicle can be therefore predicted to be longer than the diagnosis time that is required to execute the air flow meter diagnosis processing. Thus, the EGR diagnosis processing is executed after the air flow meter diagnosis processing has been started.

When a gear position with a high transmission gear ratio has been selected in the transmission, the decelerating effect of the engine brake is stronger and the deceleration of the vehicle tends to be higher compared to when a gear position with a low transmission gear ratio has been selected. Thus, it can be predicted that the duration of deceleration of the vehicle will be shorter as a gear position with a higher transmission gear ratio has been selected in the transmission. In the above diagnosis device, the electronic control unit may be configured to set the determination value to a higher value as a gear position with a higher transmission gear ratio is selected in a transmission of the vehicle. According to the above configuration, the determination value can be determined to a value suitable for the running conditions of the vehicle at the time of determination.

In the above diagnosis device, the electronic control unit may be configured to execute the air flow meter diagnosis processing without executing the EGR diagnosis processing when the vehicle is decelerated with the predetermined conditions being fulfilled after diagnosis of the EGR device by the EGR diagnosis processing has been completed. According to the above configuration, after the diagnosis of the EGR device by the EGR diagnosis processing has been completed, the air flow meter diagnosis processing is executed even when the vehicle is decelerated with the predetermined conditions being fulfilled. Thus, a situation can be prevented in which the EGR diagnosis processing is repeated despite the fact that the diagnosis of the EGR device by the EGR diagnosis processing has been completed and the opportunities for the air flow meter diagnosis processing to be executed are decreased. Thus, both the diagnosis processing can be completed promptly.

A second aspect of the present invention provides a diagnosis method for an internal combustion engine that is mounted on a vehicle, the internal combustion engine includes an EGR device and an air flow meter. The method includes (i) executing EGR diagnosis processing to diagnose whether or not the EGR device operates normally while the vehicle is being decelerated, (ii) executing air flow meter diagnosis processing to diagnose whether or not the air flow meter is normal while the vehicle is being decelerated, (iii) diagnosing the EGR device as normal in the EGR diagnosis processing when a differential pressure between a first intake pressure and a second intake pressure is equal to or higher than an abnormality determination value, the first intake pressure is an intake pressure in an intake pipe of the internal combustion engine that is determined when an EGR valve of the EGR device is closed, and the second intake pressure is an intake pressure in the intake pipe that is determined when the EGR valve is open, (iv) executing the EGR diagnosis processing after starting the air flow meter diagnosis processing, and (v) executing the EGR diagnosis processing when the air flow meter diagnosis processing has not been completed and predetermined conditions that a duration of deceleration of the vehicle is shorter than a diagnosis time that is required to execute the air flow meter diagnosis processing are fulfilled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a map that is used to select diagnosis processing that is preferentially executed based on the relationship between the vehicle speed and the gear position that are determined when the vehicle starts to be decelerated;

DETAILED DESCRIPTION OF EMBODIMENTS

Figure 1:
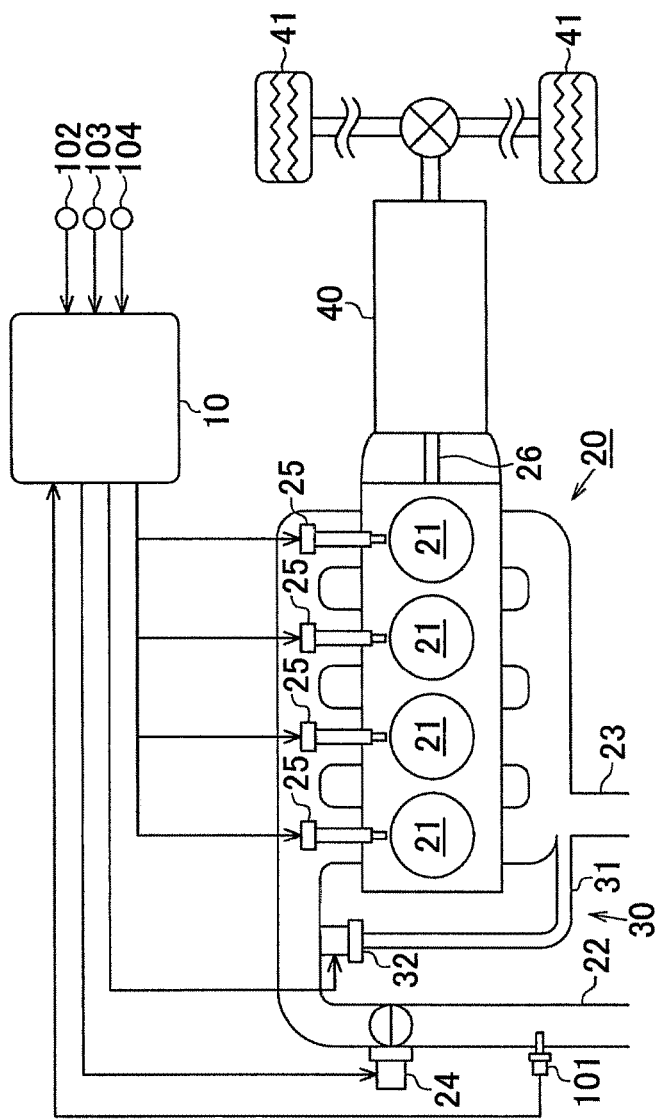
FIG. 1 is a configuration diagram that illustrates the general configuration of a vehicle that is equipped with a control device as one embodiment of a diagnosis device for an internal combustion engine.

Description is hereinafter made of one embodiment that embodies a diagnosis device for an internal combustion engine with reference to FIG. 1 to FIG. 6. In FIG. 1, an electronic control unit 10 as a diagnosis device for an internal combustion engine according to this embodiment and an internal combustion engine 20 that is controlled by the electronic control unit 10 are shown. As shown in FIG. 1, the internal combustion engine 20 has an intake pipe 22 that is used to introduce intake air into combustion chambers 21, and an exhaust pipe 23 that is used to discharge exhaust gas that is generated in the combustion chambers 21. The intake pipe 22 is equipped with an air flow meter 101 that detects the intake air amount, i.e., the amount of intake air that is flowing through the intake pipe 22, and a throttle valve 24 that is located downstream of the air flow meter 101 in the direction of intake air flow and adjusts the intake air amount. The intake pipe 22 has intake ports for respective cylinders, and a fuel injection valve 25 that injects fuel is provided in each intake port.

The internal combustion engine 20 is equipped with an exhaust gas recirculation (EGR) device 30 that returns a portion of exhaust gas that is flowing through the exhaust pipe 23 into the intake pipe 22 as EGR gas. The EGR device 30 has an EGR pipe 31 that connects the exhaust pipe 23 and the intake pipe 22, and an EGR valve 32 that adjusts the amount of EGR gas that is returned into the intake pipe 22. The EGR pipe 31, is connected to, the intake pipe 22 at a location downstream of the throttle valve 24 in the direction of intake air flow.

The internal combustion engine 20 has a crankshaft 26, to which a multi-speed transmission 40 is connected. The torque that is output from the internal combustion engine 20 is transmitted to wheels 41 via the transmission 40. The electronic control unit 10 has a microcomputer that is constituted of a CPU, a ROM, a RAM and so on. To the electronic control unit 10, a crank angle sensor 102 that detects the crank angle, i.e., the rotational phase of the crankshaft 26, an accelerator pedal operation amount sensor 103 that detects the displacement of an accelerator pedal, and a vehicle speed sensor 104 that detects the vehicle speed, in addition to the air flow meter 101, are electrically connected. The electronic control unit 10 controls the internal combustion engine 20 based on information that is detected by the above-mentioned various sensors.

When the vehicle is decelerated, the electronic control unit 10 selects either air flow meter diagnosis processing (which is hereinafter referred to also as "AFM diagnosis processing") for diagnosing the air flow meter 101 as normal or not or EGR diagnosis processing for diagnosing the EGR device 30 as being able to operate normally or not, and executes the selected diagnosis processing. While the details are described later, an intake air amount that is detected by the air flow meter 101 is used in the EGR diagnosis processing. Thus, to improve the accuracy of the result of diagnosis by the EGR diagnosis processing, the EGR diagnosis processing may be executed after the air flow meter 101 is confirmed to be normal by executing the AFM diagnosis processing.

The AFM diagnosis processing takes longer time to complete than the EGR diagnosis processing. Thus, in the AFM diagnosis processing, the air flow meter 101 cannot be diagnosed as normal or not unless the vehicle continues to be in a decelerating state for a relatively long period of time. In other words, when the duration of deceleration of the vehicle is short, the AFM diagnosis processing may not be able to be completed because the deceleration of the vehicle may be ended before the AFM diagnosis processing is completed. In the electronic control unit 10 as a diagnosis device, for an internal combustion engine according to this embodiment, it is determined whether predetermined conditions that suggest that the duration of deceleration of the vehicle will be short are fulfilled when the vehicle starts to be decelerated. Here, it is determined that the duration of deceleration of the vehicle will be short when the duration of deceleration of the vehicle will be shorter enough than the diagnosis time Tafm that is required to execute the AFM diagnosis processing that the AFM diagnosis processing may not be completed.

When the predetermined conditions are not fulfilled, it is determined that the duration of deceleration of the vehicle this time will be relatively long and there is a possibility that the AFM diagnosis processing can be completed. Thus, the AFM diagnosis processing is executed in preference to the EGR diagnosis processing as usual. In this case, the EGR diagnosis processing is executed after the air flow meter 101 is diagnosed as normal based on the result of the AFM diagnosis processing.

On the other hand, when the predetermined conditions are fulfilled, it is determined that the duration of deceleration of the vehicle this time will be relatively short and there is a possibility that the AFM diagnosis processing may not be able to be completed while the vehicle is being decelerated this time. Thus, the EGR diagnosis processing is executed in preference to the AFM diagnosis processing. In this case, the EGR diagnosis processing is executed if when the AFM diagnosis processing has not been completed.

It can be determined whether the predetermined conditions are fulfilled with reference to the map that is shown in FIG. 2. In other words, the EGR diagnosis processing is selected as diagnosis processing that is executed preferentially when it can be determined that the predetermined conditions are fulfilled with reference to the map, whereas the AFM diagnosis processing is selected as diagnosis processing that is executed preferentially when it can be determined that the predetermined conditions are not fulfilled.

The map that is shown in FIG. 2 is next described. FIG. 2 is a map that is used to determine the diagnosis processing that is executed preferentially based on the vehicle speed V and the gear position of the transmission 40 that are determined when the vehicle starts to be decelerated. As shown in FIG. 2, when the transmission 40 is in the fifth gear position, the EGR diagnosis processing is selected as the preferential diagnosis processing when the vehicle speed V that is determined when the vehicle starts to be decelerated is lower than a first vehicle speed V1, which is higher than "0 (zero)." On the other hand, when the transmission 40 is in the fifth gear position, the AFM diagnosis processing is selected as the preferential diagnosis processing when the vehicle speed V that is determined when the vehicle starts to be decelerated is equal to or higher than the first vehicle speed V1. In other words, when the transmission 40 is in the fifth gear position, the first vehicle speed V1 serves as a "determination value" which is used to determine whether the preference is given to the AFM diagnosis processing or the EGR diagnosis processing, and it is determined that the predetermined conditions are fulfilled when the vehicle speed V that is determined when the vehicle starts to be decelerated is lower than the first vehicle speed V1.

When the transmission 40 is in a gear position with a higher transmission gear ratio than the fifth gear position, such as the third or fourth gear position, the EGR diagnosis processing is selected as the preferential diagnosis processing when the vehicle speed V that is determined when the vehicle starts to be decelerated is lower than a second vehicle speed V2, which is higher than the first vehicle speed V1. On the other hand, when the transmission 40 is in the third or fourth gear position, the AFM diagnosis processing is selected as the preferential diagnosis processing when the vehicle speed V that is determined when the vehicle starts to be decelerated is equal to higher than the second vehicle speed V2. In other words, when the transmission 40 is in the third or fourth gear position, the second vehicle speed V2 serves as a "determination value," and it is determined that the predetermined conditions are fulfilled when the vehicle speed V that is determined when the vehicle starts to be decelerated is lower than the second vehicle speed V2.

When the transmission 40 is in a gear position with a higher transmission gear ratio than the third and fourth gear positions, such as the first or second gear position, the EGR diagnosis processing is selected as the preferential diagnosis processing when the vehicle speed V that is determined when the vehicle starts to be decelerated is lower than a third vehicle speed V3, which is higher than the second vehicle speed V2. On the other hand, when the transmission 40 is in the first or second gear position, the AFM diagnosis processing is selected as the preferential diagnosis processing when the vehicle speed V that is determined when the vehicle starts to be decelerated is equal to higher than the third vehicle speed V3. In other words, when the transmission 40 is in the first or second gear position, the third vehicle speed V3 serves as a "determination value," and it is determined that the predetermined conditions are fulfilled when the vehicle speed V that is determined when the vehicle starts to be decelerated is lower than the third vehicle speed V3.

As described above, a higher determination value is used as a gear position with a higher transmission gear ratio is selected in the transmission 40. This is because the decelerating effect of the engine brake is stronger and the deceleration of the vehicle tends to be higher as the transmission gear ratio is higher. As described above, the duration of deceleration of the vehicle can be predicted to be shorter as the deceleration of the vehicle is higher because the time that is required to bring the vehicle to a halt tends to be shorter.

Figure 3:
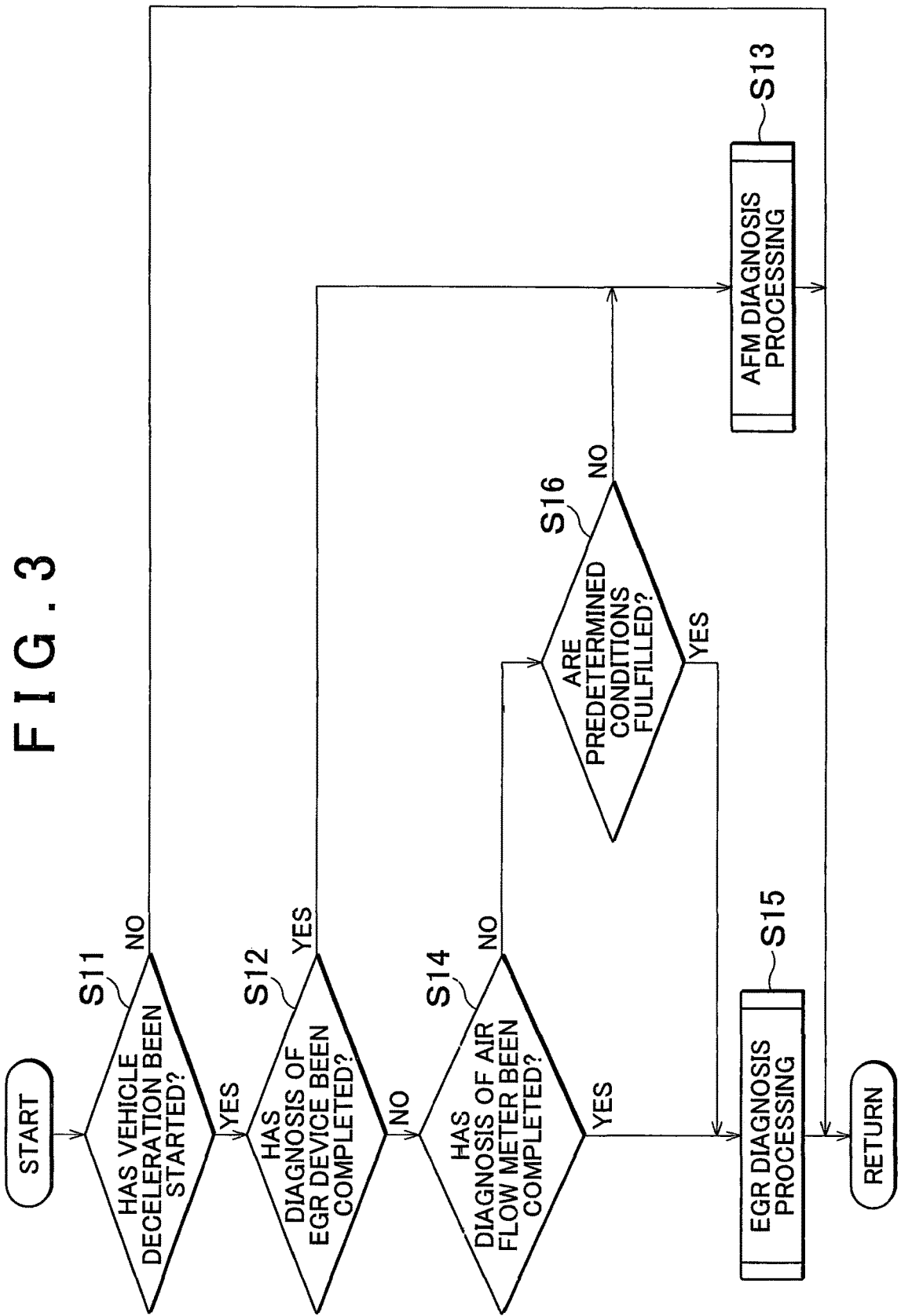
FIG. 3 is a flowchart that is used to explain a processing routine that is executed in the control device of the embodiment when either of air flow meter diagnosis processing or EGR diagnosis processing is selectively executed.

The processing routine that the electronic control unit 10 executes when the AFM diagnosis processing or EGR diagnosis processing is executed while the vehicle is being decelerated is next described with reference to a flowchart that is shown in FIG. 3. The processing routine is executed in every preset control cycle while the engine is operating.

As shown in FIG. 3, in this processing routine, the electronic control unit 10 determines whether deceleration of the vehicle has been started (step S11). For example, the electronic control unit 10 determines that deceleration of the vehicle has been started when the vehicle speed V shows a tendency to decrease while the accelerator pedal is not being operated. If it is not the timing to start deceleration of the vehicle (step S11: NO), the electronic control unit 10 terminates the current processing routine.

On the other hand, if deceleration of the vehicle has been started (step S11: YES), the electronic control unit 10 determines whether diagnosis of the EGR device 30 by the EGR diagnosis processing has been completed (step S12). If diagnosis of the EGR device 30 has been completed (step S12: YES), the electronic control unit 10 executes the AFM diagnosis processing (step S13), and then terminates the current processing routine. In other words, when diagnosis of the EGR device 30 has already been completed, the electronic control unit 10 executes the AFM diagnosis processing while the vehicle is being decelerated regardless of whether the predetermined conditions are fulfilled.

On the other hand, if diagnosis of the EGR device 30 has not been completed yet (step S12: NO), the electronic control unit 10 determines whether diagnosis of the air flow meter 101 by the AFM diagnosis processing has been completed (step S14). If diagnosis of the air flow meter 101 has been completed (step S14: YES), the electronic control unit 10 executes the EGR diagnosis processing (step S15), and then terminates the current processing routine. In other words, when diagnosis of the EGR device 30 has not been completed, the electronic control unit 10 executes the EGR diagnosis processing after the AFM diagnosis processing has been completed.

On the other hand, if diagnosis of the air flow meter 101 has not been completed yet (step S14: NO), the electronic control unit 10 determines whether the predetermined conditions are fulfilled based on the vehicle speed V and the gear position of the transmission 40 that were determined when the vehicle started to be decelerated using the map that is shown in FIG. 2 (step S16). If the predetermined conditions are fulfilled (step S16: YES), in other words, if the vehicle speed V that was determined when the vehicle started to be decelerated is lower than the determination value, the electronic control unit 10 executes the EGR diagnosis processing (step S15), and then terminates the current processing routine. On the other hand, if the predetermined conditions are not fulfilled (step S16: NO), in other words, the vehicle speed V that was determined when the vehicle started to be decelerated is equal to or higher than the determination value, the electronic control unit 10 executes the AFM diagnosis processing (step S13), and then terminates the current processing routine.

Figure 4:
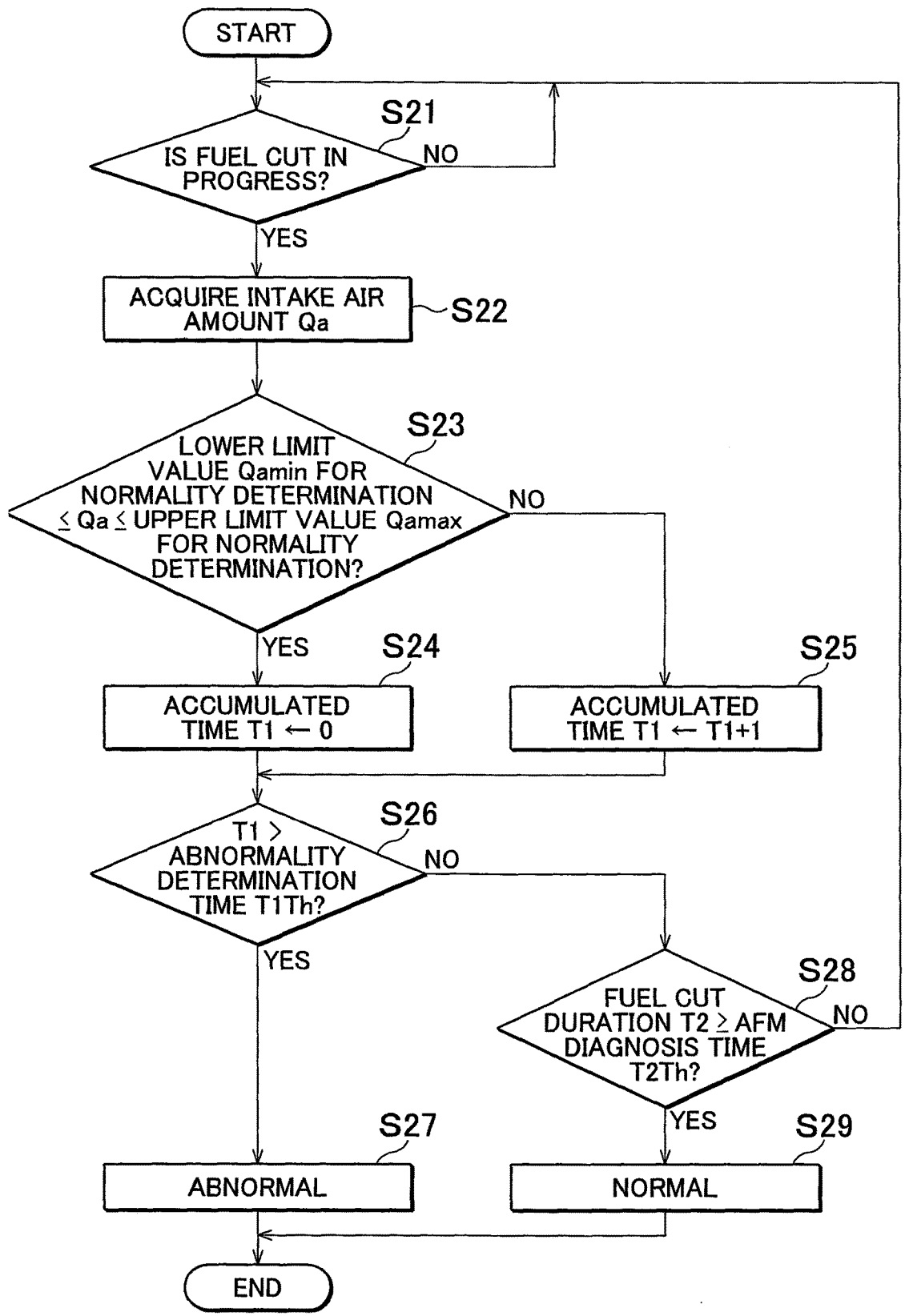
FIG. 4 is a flowchart that is used to explain a processing routine that is executed in the control device when air flow meter diagnosis processing is executed.

The AFM diagnosis processing (AFM diagnosis processing routine) in step S13 is next described with reference to a flowchart that is shown in FIG. 4. The AFM diagnosis processing routine is executed while the vehicle is being decelerated, and is forcibly terminated when the vehicle is brought to a halt or starts to be accelerated while the electronic control unit 10 is executing it. Thus, when the duration of deceleration of the vehicle is short, the AFM diagnosis processing routine may be forcibly terminated before the air flow meter 101 is diagnosed as normal or abnormal.

As shown in FIG. 4, in the AFM diagnosis processing routine, the electronic control unit 10 determines whether fuel cut, i.e., shutoff of fuel injection into the combustion chambers 21, is in progress (step S21). If fuel cut is not in progress (step S21: NO), the electronic control unit 10 repeats the determination processing in step S21 until fuel cut is started.

On the other hand, if fuel cut is in progress (step S21: YES), the electronic control unit 10 acquires an intake air amount Qa that is detected by the air flow meter 101 (step S22). Then, the electronic control unit 10 reads out a lower limit value Qamin and an upper limit value Qamax for normality determination, and determines whether the acquired intake air amount Qa is equal to or greater than the lower limit value Qamin for normality determination and equal to or smaller than the upper limit value Qamax for normality determination (step S23). The lower limit value Qamin for normality determination has been set to a value below which the actual intake air amount in the intake pipe 22 never falls while vehicle is being decelerated with fuel being cut off. Similarly, the upper limit value Qamax for normality determination has been set to a value which the actual intake air amount in the intake pipe 22 never exceeds while vehicle is being decelerated with fuel being cut off.

If the intake air amount Qa is equal to or greater than the lower limit value Qamin for normality determination and equal to or smaller than the upper limit value Qamax for normality determination (step S23: YES), the electronic control unit 10 resets the accumulated time T1 to "0 (zero)" (step S24), and advances its processing to step S26, which is described later. On the other hand, if the intake air amount Qa is smaller than the lower limit value Qamin for normality determination or greater than the upper limit value Qamax for normality determination, (step S23: NO), the electronic control unit 10 increments the accumulated time T1 by "1" (step S25). In other words, when a state where the intake air amount Qa is not in the normality determination range (in other words, not in the range between the lower limit value Qamin and upper limit value Qamax) is defined as "potentially abnormal state," the accumulated time T1 corresponds to the duration of the potentially abnormal state. After updating the accumulated time T1, the electronic control unit 10 advances its processing to the next step, i.e., step S26.

In step S26, the electronic control unit 10 determines whether the accumulated time T1 exceeds a preset abnormality determination time T1Th (which corresponds to several seconds, for example). In other words, when the air flow meter 101 is in an abnormal condition, a difference continues to exist between the intake air amount Qa that is detected by the air flow meter 101 and the actual intake air amount in the intake pipe 22 and the potentially abnormal state as described above continues to exist. Thus, when the accumulated time T1 exceeds the abnormality determination time T1Th, the air flow meter 101 can be diagnosed as having a failure.

Thus, if the accumulated time T1 exceeds the abnormality determination time T1Th (step S26: YES), the electronic control unit 10 diagnoses the air flow meter 101 as abnormal (step S27), and terminates the AFM diagnosis processing routine. On the other hand, if the accumulated time T1 is equal to or shorter than the abnormality determination time T1Th (step S26: NO), the electronic control unit 10 determines whether the fuel cut duration T2 is equal to or longer than an AFM diagnosis time T2Th (step S28). The AFM diagnosis time T2Th has been set to a value that is generally equal to the abnormality determination time T1Th or longer than the abnormality determination time T1Th.

If the fuel cut duration T2 is shorter than the AFM diagnosis time T2Th (step S28: NO), the electronic control unit 10 advances its processing to step S21, which has been described before. On the other hand, if the fuel cut duration T2 is equal to or longer than the AFM diagnosis time T2Th (step S28: YES), the electronic control unit 10 diagnoses the air flow meter 101 as normal (step S29), and terminates the AFM diagnosis processing routine.

One example of the EGR diagnosis processing (EGR diagnosis processing routine) in step S15 of FIG. 3 is next described. The EGR diagnosis processing routine is executed while the vehicle is being decelerated, and is forcibly terminated when the vehicle is brought to a halt or starts to be accelerated while the electronic control unit 10 is executing it.

In the EGR diagnosis processing routine, the electronic control unit 10 forcibly closes the EGR valve 32 to regulate the inflow of EGR gas into the intake pipe 22. The electronic control unit 10 adjusts the opening of the throttle valve 24 so that the intake air amount in the intake pipe 22 can be within a predetermined range. Then, the electronic control unit 10 calculates, based on the intake air amount Qa that is detected by the air flow meter 101 in this state, a calculated value PmA of the intake pressure in the intake pipe 22.

After the calculation of the calculated value PmA of the intake pressure, the electronic control unit 10 forcibly opens the EGR valve 32 to cause EGR gas to flow into the intake pipe 22. Then, the electronic control unit 10 calculates, based on the intake air amount Qa that is detected by the air flow meter 101 in this state, a calculated value PmB of the intake pressure in the intake pipe 22. Then, the electronic control unit 10 calculates the differential pressure $\Delta Pm$ (=|PmA−PmB|) between the calculated value PmA of the intake pressure and the calculated value PmB of the intake pressure. Then, the electronic control unit 10 diagnoses the EGR device 30 as operating normally when the differential pressure $\Delta Pm$ is equal to or higher than a predetermined abnormality determination value $\Delta PmTh$, whereas the electronic control unit 10 diagnoses the EGR device 30 as possibly operating abnormally when the differential pressure $\Delta Pm$ is lower than the predetermined abnormality determination value $\Delta PmTh$.

Figure 5:
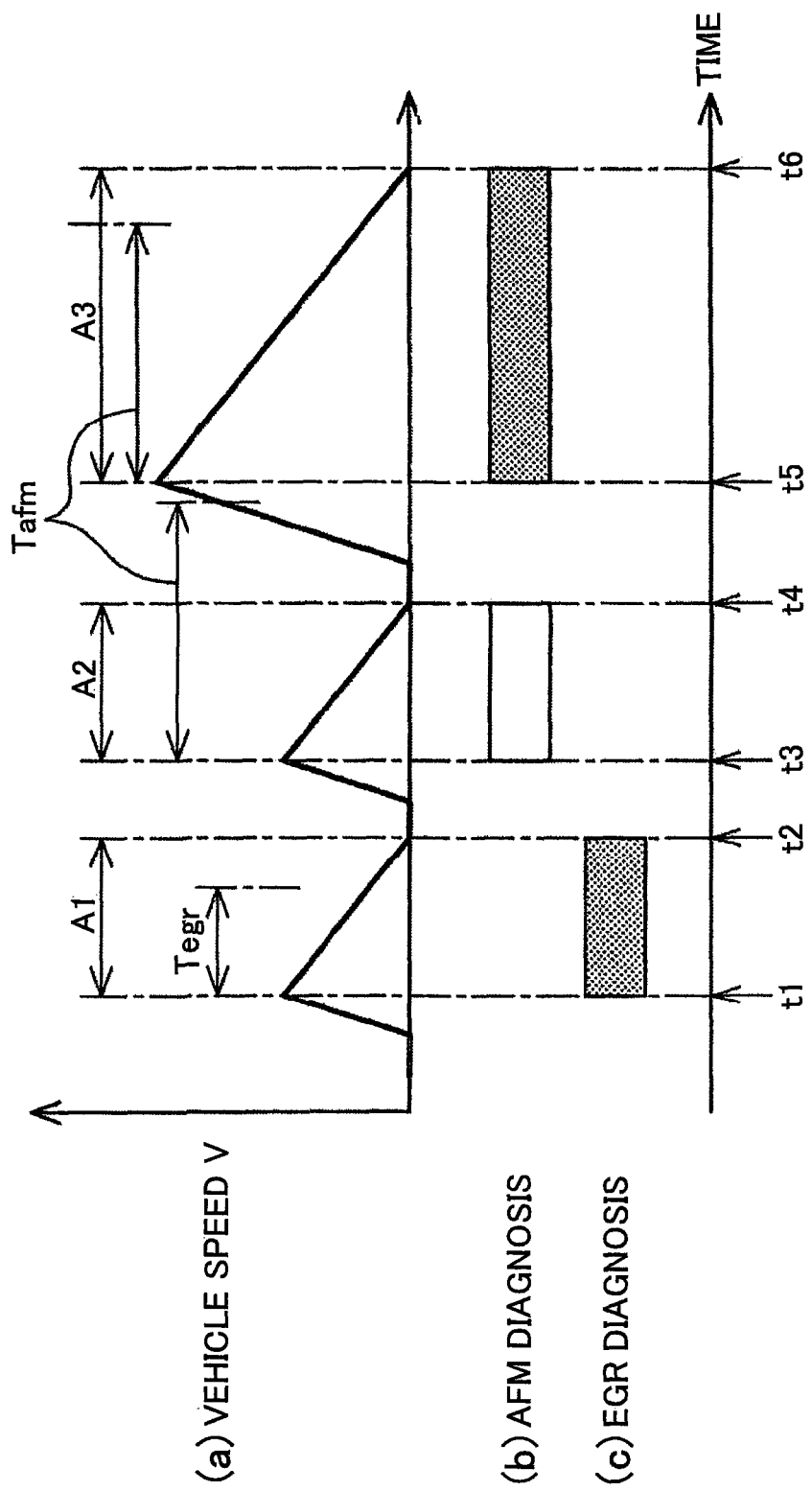
FIG. 5 is a timing chart that illustrates the timings when the air flow meter diagnosis processing and the EGR diagnosis processing are executed in a vehicle that is equipped with the control device, wherein (a) shows the changes in vehicle speed, (b) shows whether the air flow meter diagnosis processing is executed and whether the air flow meter diagnosis processing is completed, and (c) shows whether the EGR diagnosis processing is executed and the EGR diagnosis processing is completed.
Figure 6:
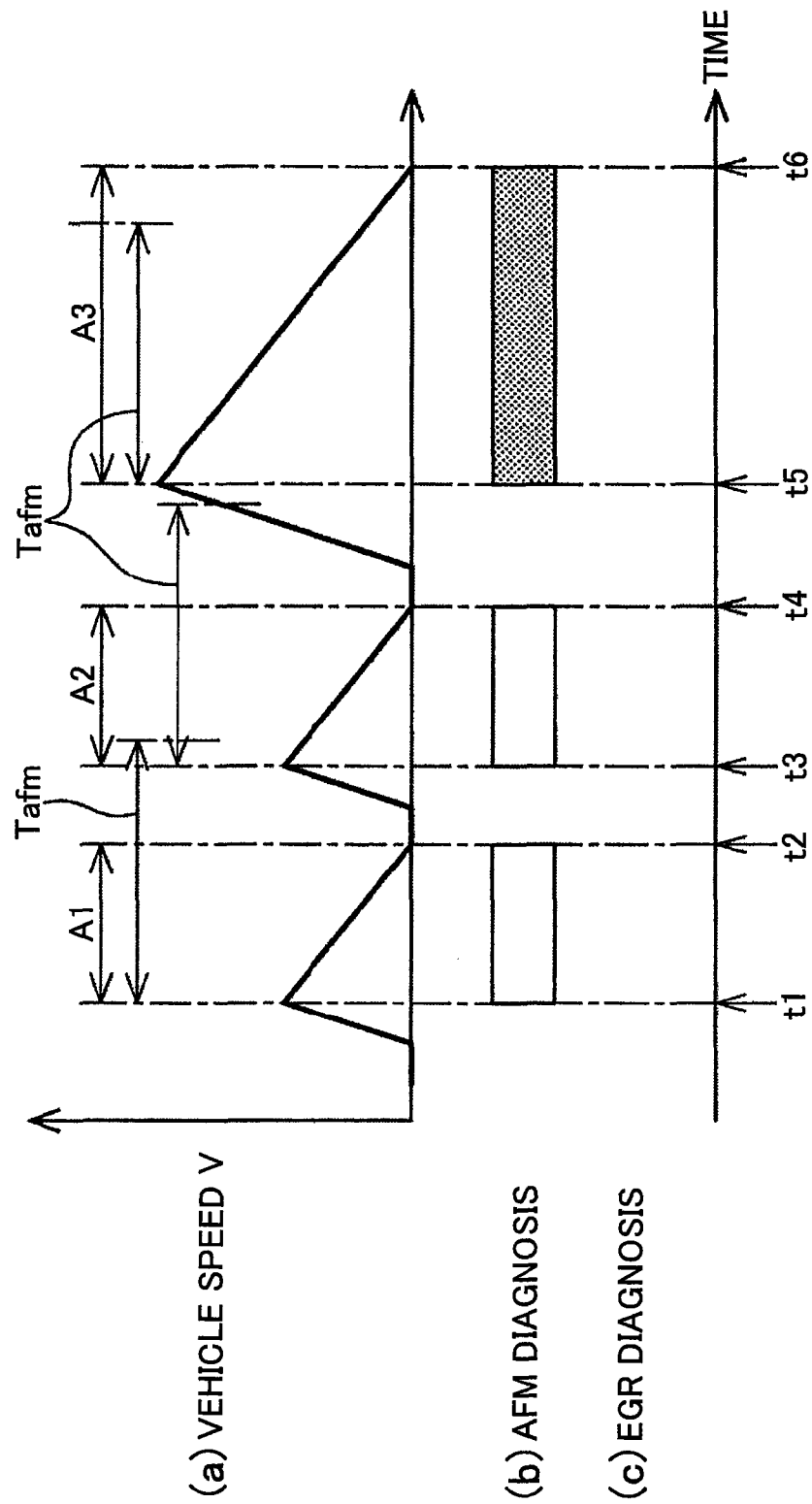
FIG. 6 is a timing chart that illustrates the timings when the air flow meter diagnosis processing and the EGR diagnosis processing are executed in a vehicle of a comparative example, wherein (a) shows the changes in vehicle speed, (b) shows whether the air flow meter diagnosis processing is executed and whether the air flow meter diagnosis processing is completed, and (c) shows whether the EGR diagnosis processing is executed and the EGR diagnosis processing is completed.

The effect of executing either the EGR diagnosis processing or the air flow meter diagnosis processing selectively while the vehicle is being decelerated is next described with reference to timing charts that are shown in FIG. 5 and FIG. 6. FIG. 5 shows a timing chart in the case of a vehicle that is equipped with the electronic control unit 10 as a diagnosis device for an internal combustion engine according to this embodiment. On the other hand, FIG. 6 shows a timing chart in the case of a comparative example in which the AFM diagnosis processing is executed in preference to the EGR diagnosis processing regardless of whether the predetermined conditions are fulfilled. The bars in the fields (b) and (c) in FIG. 5 and FIG. 6 indicate that the AFM diagnosis processing or the EGR diagnosis processing is executed, and the hatching in the bars indicates that the diagnosis processing is completed.

As shown in FIG. 5(a) to FIG. 5(c), in a vehicle that is equipped with the electronic control unit 10 as a diagnosis device for an internal combustion engine according to this embodiment, it is determined that the predetermined conditions are fulfilled at a first timing t1 when the vehicle starts to be decelerated because the vehicle speed V at the first timing t1 is lower than a determination value corresponding to the gear position of the transmission 40 at that point in time. Thus, in a first deceleration period A1, i.e., the deceleration period from the first timing t1, the EGR diagnosis processing is executed even if the AFM diagnosis processing has not been completed. The first deceleration period A1 ends at a second timing t2 when the vehicle is brought to a halt. Here, because the first deceleration period A1 is longer than the diagnosis time Tegr that is required to execute the EGR diagnosis processing, the EGR diagnosis processing is completed by the second timing t2.

After that, the vehicle is started and then starts to be decelerated again at a third timing t3. Because the EGR diagnosis processing has been completed during the first deceleration period A1, the AFM diagnosis processing is executed in a second deceleration period A2, i.e., the deceleration period from the third timing t3. The second deceleration period A2 ends at a fourth timing t4 when the vehicle is brought to a halt. Here, because the second deceleration period A2 is shorter than the diagnosis time Tafm that is required to execute the AFM diagnosis processing, the AFM diagnosis processing is not completed during the second deceleration period A2.

After that, the vehicle is started and then starts to be decelerated again at a fifth timing t5. The AFM diagnosis processing is executed again in a third deceleration period A3, i.e., the deceleration period from the fifth timing t5. The third deceleration period A3 ends at a sixth timing t6 when the vehicle is brought to a halt. Because the third deceleration period A3 is longer than the diagnosis time Tafm that is required to execute the AFM diagnosis processing, the AFM diagnosis processing is completed by the sixth timing t6.

On the other hand, in the case of the comparative example, the AFM diagnosis processing is executed in preference to the EGR diagnosis processing at all times. Thus, even in the first deceleration period A1 and the second deceleration period A2, the AFM diagnosis processing is executed as shown in FIG. 6(a) to FIG. 6(c). Because the first and second deceleration periods A1, A2 are shorter than the diagnosis time Tafm that is required to execute the AFM diagnosis processing, the AFM diagnosis processing is not completed. On the other hand, because the third deceleration period A3 is longer than the diagnosis time Tafm that is required to execute the AFM diagnosis processing, the AFM diagnosis processing is completed during the third deceleration period A3. Thus, in this case, the EGR diagnosis processing is finally executed during a deceleration period after the sixth timing t6.

As described above, in the case of a vehicle that is equipped with the electronic control unit 10 as a diagnosis device for an internal combustion engine according to this embodiment, the EGR diagnosis processing is executed during the first deceleration period A1, which is too short to complete the AFM diagnosis processing. Thus, both the AFM diagnosis processing and the EGR diagnosis processing can be completed by the sixth timing t6. In other words, in a vehicle that is equipped with the electronic control unit 10 according to this embodiment, both the diagnosis processing can be completed earlier than in the case of the comparative example.

According to the above configuration and operation, the following effects can be achieved. When the duration of deceleration of the vehicle is long, the AFM diagnosis processing is executed first and the EGR diagnosis processing can be executed after the air flow meter 101 is confirmed to be normal. Thus, the reliability of the EGR diagnosis processing, which uses an intake air amount Qa that is detected by the air flow meter 101, can be improved.

On the other hand, when the vehicle is decelerated with predetermined conditions that suggest that the duration of deceleration of the vehicle will be short being fulfilled, the EGR diagnosis processing is executed even if the AFM diagnosis processing has not been completed. Thus, a situation can be prevented in which the EGR diagnosis processing cannot be executed for a long period of time because the AFM diagnosis processing is repeatedly executed despite the fact that it cannot be completed.

In other words, the EGR diagnosis processing is, basically, executed on condition that the AFM diagnosis processing has been completed, whereas, when it is predicted that the AFM diagnosis processing cannot be completed, the EGR diagnosis processing is executed. It is, therefore, possible to prevent a decrease in reliability of the EGR diagnosis processing and to ensure opportunities for the EGR diagnosis processing to be executed.

As the vehicle speed V that is determined when the vehicle starts to be decelerated is higher, the time required to bring the vehicle to a halt tends to be longer and the duration of deceleration of the vehicle can be therefore predicted to be longer. Thus, in the above embodiment, it is determined whether the predetermined conditions are fulfilled based on whether the vehicle speed V that is determined when the vehicle starts to be decelerated is lower than a determination value. In this case, when the vehicle speed V that is determined when the vehicle starts to be decelerated is lower than a determination value, the predetermined conditions are fulfilled and the duration of deceleration of the vehicle can be therefore predicted to be short. Thus, EGR diagnosis processing can be executed even if the AFM diagnosis processing has not been completed. On the other hand, when the vehicle speed V that is determined when the vehicle starts to be decelerated is equal to or higher than the determination value, the predetermined conditions are not fulfilled and the duration of deceleration of the vehicle can be therefore predicted to be long. Thus, the EGR diagnosis processing can be executed after the AFM diagnosis processing has been completed.

When a gear position with a high transmission gear ratio has been selected in the transmission 40, the decelerating effect of the engine brake is stronger and the deceleration of the vehicle tends to be higher compared to when a gear position with a low transmission gear ratio has been selected. In other words, the duration of deceleration of the vehicle can be predicted to be short. Thus, in the above embodiment, a higher determination value is used as a gear position with a higher transmission gear ratio is selected in the transmission 40. Thus, the determination value can be determined to a value suitable for the running conditions of the vehicle at the time of determination.

In the above embodiment, after the diagnosis of the EGR device 30 by the EGR diagnosis processing has been completed, the AFM diagnosis processing is executed even when the vehicle is decelerated with the predetermined conditions being fulfilled. Thus, a situation can be prevented in which the EGR diagnosis processing is repeated despite the fact that the diagnosis of the EGR device 30 by the EGR diagnosis processing has been completed and the opportunities for the AFM diagnosis processing to be executed are decreased. Thus, both the diagnosis processing can be completed promptly.

The above embodiment may be changed to another embodiment as described below. When the predetermined conditions are fulfilled, it is predicted that the AFM diagnosis processing cannot be completed while the vehicle is being decelerated. Thus, even after the diagnosis of the EGR device 30 by the EGR diagnosis processing has been completed, the AFM diagnosis processing may not be executed when the vehicle is decelerated with the predetermined conditions being fulfilled.

The determination value that is used to determine whether the predetermined conditions are fulfilled may be a constant value regardless of the gear position of the transmission 40 that is determined when the vehicle starts to be decelerated. For example, when the second vehicle speed V2 is used as the determination value, it is determined that the predetermined conditions are not fulfilled as long as the vehicle speed is equal to or higher than the second vehicle speed V2 regardless of whether the transmission 40 is in the first gear position or in the fifth gear position when the vehicle starts to be decelerated. Even when the determination value is fixed to a constant value, the same effects as those of the above embodiment can be achieved. In this case, because the information on the gear position is not necessary to determine whether the predetermined conditions are fulfilled, the transmission may be a continuously variable transmission instead of a multi-speed transmission.

The actual deceleration of the vehicle depends not only on the gear position of the transmission 40 but also on how much the brake is operated by the driver, the gradient of the road on which the vehicle is running, and so on. The deceleration of the vehicle may be acquired when the vehicle starts to be decelerated and the duration of deceleration of the vehicle may be predicted to be shorter as the deceleration of the vehicle is higher. In this case, a method can be employed in which it is determined that the predetermined conditions are fulfilled when the predicted value of the duration of deceleration of the vehicle is smaller than a predetermined value. Even with this configuration, the same effects as those of the above embodiment can be achieved.

As a method for acquiring the deceleration of the vehicle, a calculated value obtained by differentiating the vehicle speed V with respect to time may be used or a value that is detected by a sensor that detects the acceleration (or deceleration) of the vehicle may be used. When information on the gear position is not necessary to determine whether the predetermined conditions are fulfilled, for example, when a method in which it is determined whether the predetermined conditions are fulfilled using the deceleration of the vehicle that is determined when the vehicle starts to be decelerated is employed as described above, the transmission may be a continuously variable transmission instead of a multi-speed transmission.

When the vehicle is decelerated with the predetermined conditions being unfulfilled, both the EGR diagnosis processing and the AFM diagnosis processing may be executed during the deceleration in such a manner that a part of the EGR diagnosis processing is executed simultaneously with a part of the AFM diagnosis processing. For example, the AFM diagnosis processing may be started with the EGR valve 32 closed so that the calculated value PmA of the intake pressure, which is obtained when the EGR valve 32 is closed, can be acquired while the AFM diagnosis processing is being executed. In this case, the processing for acquiring the calculated value PmA of the intake pressure in the EGR diagnosis processing is executed while the AFM diagnosis processing is being executed. When this configuration is employed, the EGR diagnosis processing is started with the AFM diagnosis processing having not been started when the vehicle is decelerated with the predetermined conditions being fulfilled. During the period in which the EGR diagnosis processing is being executed in this way, the AFM diagnosis processing may not be executed.

In the EGR diagnosis processing, the intake air amount that is detected by the air flow meter 101 may not be used if the intake pressure in the intake pipe 22 can be acquired. For example, when a sensor that detects the intake pressure in the intake pipe 22 is provided, an intake pressure that is detected by the sensor may be used in the EGR diagnosis processing instead of a calculated value of the intake pressure that is calculated based on the intake air amount Qa that is detected by the air flow meter 101.

The invention claimed is:

1. A diagnosis device for an internal combustion engine that is mounted on a vehicle, the internal combustion engine including an EGR device and an air flow meter, the diagnosis device comprising:
an electronic control unit configured to:
execute EGR diagnosis processing to diagnose whether or not the EGR device operates normally while the vehicle is decelerated;
execute air flow meter diagnosis processing to diagnose whether or not the air flow meter is normal while the vehicle is decelerated;
diagnose the EGR device as normal in the EGR diagnosis processing when a differential pressure between a first intake pressure and a second intake pressure is equal to or higher than an abnormality determination value, the first intake pressure being an intake pressure in an intake pipe of the internal combustion engine that is determined when an EGR valve of the EGR device is closed, and the second intake pressure being an intake pressure in the intake pipe that is determined when the EGR valve is open;
execute the EGR diagnosis processing after starting the air flow meter diagnosis processing; and
execute the EGR diagnosis processing when the air flow meter diagnosis processing has not been completed and a predetermined condition that a duration of deceleration of the vehicle is shorter than a diagnosis time that is required to execute the air flow meter diagnosis processing are fulfilled.

2. The diagnosis device according to claim 1, wherein the electronic control unit is configured to execute the EGR diagnosis processing after the air flow meter diagnosis processing has been completed when the predetermined conditions are not fulfilled.

3. The diagnosis device according to claim 1, wherein the predetermined conditions include a condition that a vehicle speed that is determined when the vehicle starts to be decelerated is lower than a determination value.

4. The diagnosis device according to claim 3, wherein the electronic control unit is configured to set the determination value to a higher value as a gear position with a higher transmission gear ratio is selected in a transmission of the vehicle.

5. The diagnosis device according to claim 1, wherein the electronic control unit is configured to execute the air flow meter diagnosis processing without executing the EGR diagnosis processing when the vehicle is decelerated with the predetermined conditions being fulfilled after diagnosis of the EGR device by the EGR diagnosis processing has been completed.

6. A diagnosis method for an internal combustion engine that is mounted on a vehicle, the internal combustion engine including an EGR device, an air flow meter and an electronic control unit, the diagnosis method comprising:
executing, by the electronic control unit, EGR diagnosis processing to diagnose whether or not the EGR device operates normally while the vehicle is decelerated;
executing, by the electronic control unit, air flow meter diagnosis processing to diagnose whether or not the air flow meter is normal while the vehicle is decelerated;
diagnosing, by the electronic control unit, the EGR device as normal in the EGR diagnosis processing when a differential pressure between a first intake pressure and a second intake pressure is equal to or higher than an abnormality determination value, the first intake pressure being an intake pressure in an intake pipe of the internal combustion engine that is determined when an EGR valve of the EGR device is closed, and the second intake pressure being an intake pressure in the intake pipe that is determined when the EGR valve is open;
executing, by the electronic control unit, the EGR diagnosis processing after starting the air flow meter diagnosis processing; and
executing, by the electronic control unit, the EGR diagnosis processing when the air flow meter diagnosis processing has not been completed and a predetermined condition that a duration of deceleration of the vehicle is shorter than a diagnosis time that is required to execute the air flow meter diagnosis processing are fulfilled.

* * * * *